United States Patent [19]
Kato et al.

[11] Patent Number: 4,793,797
[45] Date of Patent: Dec. 27, 1988

[54] METHOD OF CATALYTIC COMBUSTION USING HEAT-RESISTANT CATALYST

[75] Inventors: Akira Kato; Hisao Yamashita; Hiroshi Kawagoshi, all of Hitachi; Noriko Watanabe, Mito; Shinpei Matsuda, Tokai, all of Japan

[73] Assignees: Hitachi, Ltd.; Babcock-Hitachi Kabushiki Kaisha, both of Tokyo, Japan

[21] Appl. No.: 95,617

[22] Filed: Sep. 10, 1987

[30] Foreign Application Priority Data

Sep. 10, 1986 [JP] Japan .................................. 61-211659
Mar. 6, 1987 [JP] Japan .................................. 62-50067

[51] Int. Cl.$^4$ .............................................. F23D 3/40
[52] U.S. Cl. ....................................................... 431/7
[58] Field of Search ..................... 431/7; 502/302, 313, 502/327, 328, 329

[56] References Cited

U.S. PATENT DOCUMENTS

| 3,966,391 | 6/1976 | Hindin et al. | 431/7 |
| 4,088,435 | 5/1978 | Hindin et al. | 431/7 |
| 4,154,568 | 5/1979 | Kendall et al. | 431/328 X |
| 4,295,818 | 10/1981 | Angwin et al. | 431/7 |

Primary Examiner—W. J. Shine
Attorney, Agent, or Firm—Antonelli, Terry & Wands

[57] ABSTRACT

This invention relates to a method of catalytic combustion using a heat-resistant catalyst and, in particular, relates to a method of catalytic combustion using a heat-resistant catalyst suitable for combustion at a temperature ranging from 800° C. to 1500° C.

9 Claims, 5 Drawing Sheets

FIG. 1(a)
FIG. 1(b)
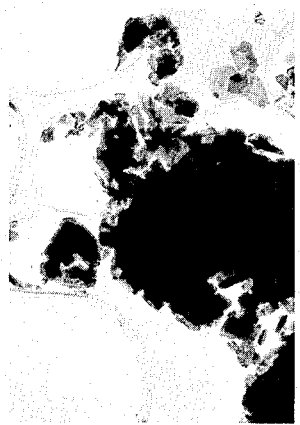
FIG. 1(c)
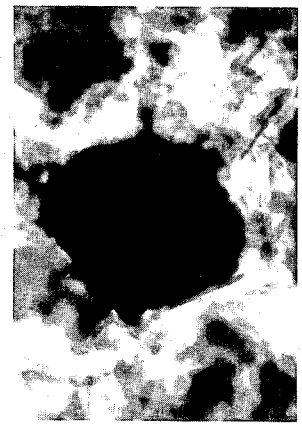

METHOD OF CATALYTIC COMBUSTION USING HEAT-RESISTANT CATALYST

BACKGROUND OF THE INVENTION

This invention relates to a method of catalytic combustion using a heat-resistant catalyst. More particularly, the present invention is concerned with a method of catalytic combustion using a heat-resistant catalyst suited for combustion at a temperature ranging from 800° to 1500° C.

Known catalysts which have been employed as a high temperature catalyst include a catalyst comprising a carrier such as alumina, silica or silica-alumina and a noble metal or base metal carried thereon, and a catalyst composed of a carrier comprising a ceramic material such as zirconia, aluminum titanate, cordierite or silicon nitride having a coating of an active alumina or the like on its surface and a noble metal component carried on the coating. However, these catalysts have a drawback that when the temperature is as high as 800° C. or above, they generally experience alteration of a crystalline structure of the carrier (e.g., phase transition from $\gamma$-type to $\alpha$-type in the case of alumina) and/or the specific surface area decrease accompanying crystal growth, thereby causing a decrease in active sites due to agglomeration of active components, which in turn leads to a lowered catalytic activity. For example, a conventional catalyst composed of a carrier comprising alumina and palladium carried thereon has a specific surface area of about 150 m$^2$/g and a palladium particle diameter of 30 Å after heat treatment at 600° C., but it comes to have a specific surface area of about 3 m$^2$/g and a palladium particle diameter of about 200 Å upon being heated at 1200° C. for 2 hr. That is, due to heat treatment at a high temperature, palladium particles which are finely dispersed on the carrier agglomerate into large particles as a result of a decrease in the specific surface area of the carrier, thereby causing the active sites of the catalyst to decrease, so that a decrease in catalytic activity is brought about.

As an improved catalyst over the above-mentioned catalysts for high temperatures, Japanese Patent Laid-Open No. 52529/1984 proposes a catalyst which suppresses agglomeration of a noble metal through the use of a carrier prepared by coating a heat-resistant carrier with a mixture of $\gamma$-alumina with cerium, lanthanum, strontium, tin, zirconium or magnesium and a ceramic whisker. On the other hand, Japanese Patent Laid-Open No. 169536/1984 proposes a catalyst prepared by coating a heat-resistant carrier with a mixture of $\gamma$-alumina with langthanum or cerium and strontium, contacting particles of a base metal such as nickel, chromium or cobalt with the coated carrier, and further depositing platinum or palladium thereon. Although each of these improved catalysts has its own advantages, the heat resistance is not satisfactory.

Meanwhile, although its application field is different from that intended in the present invention, a catalyst for the oxidative cleaning of exhaust gases of automobiles is disclosed in a Japanese Patent Laid-Open No. 26390/1977. This catalyst has active sites of platinum or palladium decreased by addition of a metal of different kind such as magnesium or barium, and is intended to be used at a temperature ranging from 300° C. to 600° C.

As disclosed in Japanese Patent Laid-Open No. 222145/1985, it was found that an effective catalyst could be obtained by the use of a carrier comprising lanthanum-$\beta$-alumina (La$_2$O$_3$·11~14 Al$_2$O$_3$) produced by adding lanthanum to aluminum, which was improved in thermal stability as compared with the conventional carriers so as to prevent the active component particles carried thereon from undergoing agglomeration, in combination with a catalytically active component such as a noble metal or a transition metal. It was confirmed by the nitrogen adsorption test that the lanthanum-$\beta$-alumina had a low specific surface area at high temperatures. As a result of an electron microscopic observation of the active component particles on the carrier at high temperatures, it was confirmed that the particles had a small diameter and were finely dispersed. For example, a catalyst composed of lanthanum-$\beta$-alumina and palladium carrier thereon, which was calcined at 1200° C., had a specific surface area of about 30 m$^2$/g and a palladium (Pd) particle diameter of about 700 Å, thus being superior in heat resistance to the forementioned catalyst having a carrier solely comprising alumina. With respect to this catalyst composed of a carrier comprising lanthanum-$\beta$-alumina and a noble metal or base metal as a catalytically active component carried thereon, the active component agglomeration due to the specific surface area decrease of the carrier by the use at high temperatures can be desirably obviated. However, this catalyst cannot be free from agglomeration of active component particles at high temperatures, which agglomeration is independent of the changes of the carrier. Therefore, it is necessary to further improve the heat resistance of the catalyst by suppressing the agglomeration of active component particles.

SUMMARY OF THE INVENTION

The above-mentioned object can be attained by a heat-resistant catalyst composed of a heat-resistant carrier, particles of at least one platinum group element, i.e., at least one element selected from the group consisting of platinum (Pt), palladium (Pd), rhodium (Rh) and ruthenium (Ru) carried on the carrier, and at least one base metal selected from the group consisting of magnesium (Mg), manganese (Mn), niobium (Nb), zirconium (Zr), nickel (Ni), cobalt (Co), chromium (Cr), tin (Sn), and zinc (Zn) carried on both the carrier and the particles.

Since the heat-resistant catalyst of the present invention has excellent heat resistance, it can be advantageously utilized for the catalytic combustion of a hydrocarbon, carbon monoxide, or the like. Therefore the present invention provides a novel catalytic combustion method in which a combustible gas is contacted with the above-mentioned heat-resistant catalyst in the presence of oxygen.

As the carriers of which heat resistance is especially required, the most preferred one is a lanthanium-$\beta$-alumina having a specific surface area of 10 m$^2$/g or more. However, other carrier components are also available. That is, besides lanthanum-$\beta$-alumina, carriers comprising $\gamma$-alumina or lanthanum oxide and an alumina having a different crystalline morphology may be employed. These carriers may contain excess unreacted alumina and/or lanthanum oxide. Moreover, in place of lanthanum-$\beta$-alumina, other rare earth element-$\beta$-alumina carriers may be employed, wherein the other rate elements may be selected from the group consisting elements such as cerium, praseodymium, promethium, samarium, europium, gadolinium, erbium, ytterbium, yttrium, scandium, and lutetium.

Further, use may be made of at least one member selected from among oxides, nitrides and carbides of Groups IIa, IIIa, and IVa elements, such as silica, magnesia, calcia, baria, beryllia, zirconia, titania, thoria, cordierite, mullite, spodumene, aluminum titanate, silicon carbide, and silicon nitride.

The kind of the material of the carrier per se is not critical in the present invention. An appropriate carrier material may be chosen according to the usage, required heat resistance, cost, etc.

With respect to the catalytically active component carrier on the heat-resistant carrier, palladium is the most preferred when the catalyst is employed in the catalytic combustion of a hydrocarbon. However, other noble metals may be also used. That is, other catalyst components, e.g., nickel, cobalt, iron, etc., in the case of a catalyst for use in oxidation and combustion may be incorporated in active components comprising a member selected from the group consisting of platinum, rhodium and ruthenium.

The most effective component for suppressing agglomeration of noble metal particles is an oxide of a base metal element having an ionic radius smaller than that of palladium. That is, it is generally preferred that use be made of a least one base metal element having an ionic radius equal to or smaller than that of noble metals, selected from the group consisting of magnesium, manganese, nickel, cobalt, zirconium, chromium, tin, and zinc. Although strontium has an ionic radius larger than that of palladium, it has been confirmed to have an agglomeration suppressing effect against particles of platinum group elements and may be used as a base metal.

The amount of the noble metal present in the active component carried on the heat-resistant carrier ranges from 0.05 to 10% by weight, preferably from 0.1 to 1.0% by weight, based on the weight of the carrier. When the amount is less than 0.05% by weight, combustion activity is insufficient. On the other hand, the use of the noble metal in an amount of more than 10% by weight is not economically desirable.

The amount of the base metal added to suppress the agglomeration of noble metal particles ranges from 0.1 to 10 gram-atom, preferably from 5 to 10 gram-atom, per gram-atom of the noble metal. When the amount of the base metal is less than 0.1 gram-atom per gram-atom of the noble metal, the noble metal particles are liable to agglomerate, thereby causing the catalytic activity to decrease undesirably. On the other hand, when the amount of the base metal is more than 10 gram-atom per gram-atom of the noble metal, the active sites of the noble metal are masked by the base metal, thereby causing the catalytic activity to decrease undesirably.

The heat-resistant catalyst of the present invention may be most preferably prepared by a process comprising impregnating a heat-resistant carrier with a solution of a salt of a platinum group element according to customary impregnation or dipping procedures, followed by drying and calcination, and impregnating the resultant carrier containing the platinum group element with a solution of a salt of a base metal, followed by drying and calcination, thereby forming a heat-resistant base metal-platinum group element carrier. That is, it is necessary that the catalyst be in such a form that particles of a base metal oxide are present on the surface of the platinum group element particles.

The heat-resistant catalyst of the present invention is suitable for use at a temperature as high as 800° C. or above, preferably 1000° C. or above. The temperature should not, however, exceed 1500° C., at which the catalyst preferably has a specific surface area of 5 $m^2/g$ or more and a palladium particle diameter of 10,000 Å or less.

The heat-resistant catalyst of the present invention can be utilized as a catalyst for chemical reactions such as oxidation or combustion, reduction, hyrogenation, dehydrogenation and adsorption of a material consisting of an inorganic material and/or an organic material, which may be conducted at a temperature ranging from 800° C. to 1500° C. Especially, the present heat-resistant catalyst can be advantageously employed in a gas heating facility utilizing catalytic combustion, a combustor of a gas turbine, a burner for bad smell removal and other chemical reaction apparatuses operated at relatively high temperatures.

BRIEF DESCRIPTION OF THE DRAWINGS

FIGS. 1 (a), (b) and (c) respectively show electron photomicrographs illustrating the structure of platinum group element particles for catalyst No. 1 of the example (Mg-Pd-La-$\beta$-$Al_2O_3$), catalyst No. 7 of the comparative example (Pd-La-$\beta$-$Al_2O_3$) and catalyst No. 8 of the comparative example (Pd-Mg-La-$\beta$-$Al_2O_3$);

DETAILED DESCRIPTION OF THE PREFERRED EMBODIMENTS

Figure 2A:
FIGS. 2 (a) and (b) respectively show electron photomicrographs illustrating the structure of noble metal particles for catalyst No. 15 of the example (Mg-Pd-$\gamma$-$Al_2O_3$) and catalyst No. 10 of the comparative example (Pd-$\gamma$-$Al_2O_3$)

The most generally employed heat-resistant catalyst of the art is one composed of a porous carrier comprising $\gamma$-alumina or the like and an active component comprising a noble metal such as platinum, palladium, rhodium or ruthenium carried thereon. Also used in the art is a catalyst composed of a ceramics honeycomb base material comprising cordierite, mullite or the like coated with a porous alumina and a noble metal component carried thereon. In this case, when the specific surface area of the carrier is increased, the noble metal component tends to be more finely dispersed on the substrate, thereby producing a catalyst having an increased number of active sites. The present heat-resistant catalyst is characterized by copresence of the particles of an oxide of an element belonging to the Group IIa, or IV of the periodic table, especially on the noble metal particles as well, so as to suppress agglomeration of the noble metal particles on the carrier. Accordingly, the heat-resistant catalyst has extremely high heat resistance as compared with those of catalysts in which such an element is incorporated into the carrier by mixing or impregnation.

The agglomeration suppressing effect of the present invention has been confirmed by the carbon monoxide gas adsorption test or electron microscopic observation of the catalyst. Moreover, it has been confirmed that this agglomeration suppressing effect is attained by the use of a combination of the agglomeration suppressing component with an oxide carrier such as alumina, silica, magnesia, calcia, beryllia, zirconia, titania or thoria and/or a compound carrier such as cordierite, mullite, spodumene, aluminum titanate, silicon carbide or silicon nitride. That is, when a noble metal component is carried on a customary carrier comprising active alumina or the like, the agglomeration suppressing effect is attained at a high temperature, especially at 800° C. to 1000° C. At a temperature of 1000° C. or above, remarkable attainment of the agglomeration suppressing effect is observed in the case of a lanthanum-β-alumina carrier. Therefore, the agglomeration suppressing effect of the present invention can be fully attained by combination of the present agglomeration suppressing component with not only a heat-resistant catalyst having a lanthanum-β-alumina but also that having an active alumina carrier or the like. The reason for the effectiveness of an additive viz. oxides of magnesium, manganese, niobium, zirconium, cobalt, nickel, chromium, zinc, and tin in suppressing the agglomeration of platinum group element particles may be interpreted as follows. Most of inorganic compounds, especially oxide compounds in solid form, have ionic bonds, and have significant effects on ionic radius, valence and crystalline structure. Especially, when the ionic radius of an oxide in solid form is equal to or smaller than that of the active component, it is believed that palladium forms a certain solid solution together with an oxide in solid form. Formation of a solid solution is believed to occur not on the whole portion of the catalyst but on extremely microscopic portions of the catalyst surface. The ionic radii of various cations are shown in Table 1. On the catalyst surface, part of palladium is believed to be present in the form of PdO. That is, it is divalent and has an ionic radius of 0.8 Å. The oxides of barium, silver, lanthanum, cerium and calcium which exhibit poor agglomeration suppressing effects as compared with those of other base metal oxides when being added to palladium have large ionic radii. Consequently, it is difficult for these oxides to undergo solid dissolution into the crystalline lattice of palladium ions. Rather, palladium tends to undergo solid dissolution into these oxides, thereby causing the catalyst to exhibit a low activity. On the other hand, since each of magnesium, manganese, zirconium, cobalt, nickel, chromium, zinc, tin, and niobium to be employed in the present invention has an ionic radius smaller than that of palladium, it is believed that part of these base metals or oxides of these base metals undergoes solid dissolution into the crystalline lattice of palladium, thereby enabling the palladium particles to be firmly captured, so that agglomeration of the particles is successfully suppressed.

TABLE 1

| Cation and valence | Ionic radius (Å) |
| --- | --- |
| $Ba^{2+}$ | 1.47 |
| $Ag^{+}$ | 1.31 |
| $La^{3+}$ | 1.18 |

TABLE 1-continued

| Cation and valence | Ionic radius (Å) |
| --- | --- |
| $Ca^{2+}$ | 0.99~1.03 |
| $Ce^{4+}$ | 0.94 |
| $Pd^{2+}$ | 0.80 |
| $Zr^{4+}$ | 0.79 |
| $Zn^{2+}$ | 0.74 |
| $Co^{2+}$ | 0.72 |
| $Sn^{2+}$ | 0.71 |
| $Nb^{5+}$ | 0.70 |
| $Ni^{2+}$ | 0.69 |
| $Cr^{3+}$ | 0.69 |
| $Ti^{4+}$ | 0.68 |
| $Mg^{2+}$ | 0.66 |
| $Mn^{4+}$ | 0.57 |

Although strontium has an ionic radius of 1.13 Å which is larger than that of palladium, it has been confirmed that strontium has an agglomeration suppressing effect against palldium particles and may therefore be used as a base metal.

[Examples]

The present invention will now be described in more detail by the following examples which should not be construed as limiting the scope of the present invention.

Example 1

3 ml of a palladium nitrate solution (50 g/l in terms of palladium) was diluted with distilled water to have a total volume of 17 ml.

50 g of a lanthanum-β-alumina carrier prepared by molding a lanthanum-β-alumina carrier material into a cylindrical form having a diameter of 3 mm and a height of 3 mm and calcining the obtained molding at 700° C. was impregnated with the above-prepared solution. The impregnated carrier was dried at 180° C. and calcined at 600° C. to decompose the nitrate, thereby obtained a lanthanum-β-alumina-supported palladium catalyst. It is noted in this connection that the process for preparing the lanthnum-β-alumina carrier is described in detail in Japanse Patent Laid-Open No. 222145/1985. The carrier used in this example was prepared by the method as described in Example 1 thereof.

1.81 g of magnesium nitrate was dissolved in 17 ml of distilled water to prepare a solution. The above-prepared lanthanum-β-alumina-supported palladium catalyst was impregnated with the solution, dried at 180° C., and calcined at 1300° C. for 20 hr to obtain a catalyst for evaluation of heat resistance (catalyst No. 1 of the example). This catalyst was in the form of Mg—Pd—La—β—Al$_2$O$_3$. The palladium content of this catalyst was 0.3% by weight based on the total weight of the lanthanum-β-alumina carrier, while the atomic ratio of palladium to magnesium (Pd/Mg) was 1/5. In this example, the catalyst had been previously heat-treated at 1300° C. for 20 hr to examine its durability at high temperatures. In general, a gas-fired room heater (commonly known as a gas fan heater) or the like is operated at a combustion temperature of 1000° C. to 1100° C. for a long period of time (thousands of hours). Therefore, in order to evaluate whether the catalyst of the present invention can be used in a gas fan heater, the catalyst of the present example was heat treated at 1300° C. for 20 hr and then applied to a methane combustion test to determine an ignition point, thereby evaluating the heat resistance of the catalyst. In this test, the lower the ignition point, the higher the activity and heat resistance of the catalyst.

When the catalyst of the present invention is used for ordinary applications, it is calcined at an ordinary catalyst calcination temperature of 500° to 1200° C., particularly 700° to 1100° C. prior to use.

Example 2

The following catalysts Nos. 2 to 10 of the example and catalysts Nos. 1 to 6 of the comparative example were prepared in substantially the same manner as in Example 1, except that manganese nitrate, strontium nitrate, zirconium nitrate, nickel nitrate, cobalt nitrate, titanium sulfuate, chromium nitrate, zinc chloride, stannic chloride, niobium oxide, calcium nitrate, cerium nitrate, lanthanum nitrate, barium nitrate, and silver nitrate were used in place of magnesium nitrate used in Example 1.

| Catalyst | Composition |
|---|---|
| No. 2 of example | Mn—Pd—La—$\beta$-Al$_2$O$_3$ |
| No. 3 of example | Sr—Pd—La—$\beta$-Al$_2$O$_3$ |
| No. 4 of example | Zr—Pd—La—$\beta$-Al$_2$O$_3$ |
| No. 5 of example | Ni—Pd—La—$\beta$-Al$_2$O$_3$ |
| No. 6 of example | Co—Pd—La—$\beta$-Al$_2$O$_3$ |
| No. 7 of example | Cr—Pd—La—$\beta$-Al$_2$O$_3$ |
| No. 8 of example | Zn—Pd—La—$\beta$-Al$_2$O$_3$ |
| No. 9 of example | Sn—Pd—La—$\beta$-Al$_2$O$_3$ |
| No. 10 of example | Nb—Pd—La—$\beta$-Al$_2$O$_3$ |
| No. 1 of comp. example | Ti—Pd—La—$\beta$-Al$_2$O$_3$ |
| No. 2 of comp. example | Ca—Pd—La—$\beta$-Al$_2$O$_3$ |
| No. 3 of comp. example | Ce—Pd—La—$\beta$-Al$_2$O$_3$ |
| No. 4 of comp. example | La—Pd—La—$\beta$-Al$_2$O$_3$ |
| No. 5 of comp. example | Ba—Pd—La—$\beta$-Al$_2$O$_3$ |
| No. 6 of comp. example | Ag—Pd—La—$\beta$-Al$_2$O$_3$ |

In these catalysts, the amount of palladium was 0.3% by weight based on the weight of the lanthanum-$\beta$-alumina carrier. The amounts of addition of the second components, i.e., manganese oxide, strontium oxide, zirconium oxide, nickel oxide, cobalt oxide, chromium oxide, zinc oxide, tin oxides, niobium oxide, titanium sulfate, calcium oxide, cerium oxide, lanthanum oxide, barium oxide, and silver oxide, were adjusted so as to have a palladium to second metallic component atomic ratio of 1:5.

Example 3

Catalysts Nos. 11 to 16 of the example were prepared in substantially the same manner as in Example 1, except that the amount of addition of magnesium was varied. The atomic ratio of palladium to magnesium in the catalysts was as follows:

| Catalyst | Pd/Mg |
|---|---|
| No. 11 of example | 10/1 |
| No. 12 of example | 1/1 |
| No. 13 of example | 1/3 |
| No. 14 of example | 1/7 |
| No. 15 of example | 1/10 |
| No. 16 of example | 1/20 |

Comparative Example 1

A comparative catalyst free from an agglomeration suppressing agent was prepared as follows. 3 ml of a palladium nitrate solution (50 g/l in terms of palladium) was diluted with distilled water to have a total volume of 17 ml. 50 g of a lanthanum-$\beta$-alumina carrier prepared by molding a lanthanum-$\beta$-alumina carrier material into a cylindrical form having a diameter of 3 mm and a height of 3 mm was impregnated with the above-prepared solution. The impregnated carrier was dried at 180° C. and calcined at 1300° C. to obtain a catalyst for evaluation of heat resistance (catalyst No. 7 of the comparative example). In this catalyst, 0.3% by weight of palladium was supported based on the total weight of the lanthanum-$\beta$-alumina carrier.

Comparative Example 2

1.81 g of magnesium nitrate was dissolved in 17 ml of distilled water to prepare a solution. 50 g of a lanthanum-$\beta$-alumina carrier prepared by molding a lanthanum-$\beta$-alumina carrier into a cylindrical form having a diameter of 3 mm and a height of 3 mm was impregnated with the above-prepared solution, dried at 180° C., and calcined at 600° C. to remove the silver nitrate, thereby obtaining a lanthanum-$\beta$-alumina carrier-supported magnesium catalyst. 3 ml of a palladium nitrate solution (50 g/l in terms of palladium) was dissolved in distilled water to prepare a solution having a total volume of 17 ml. Catalyst No. 8 of the comparative example was prepared in substantially the same manner as in Example 1, except that the above-prepared lanthanum-$\beta$-alumina carrier-supported magnesium catalyst was impregnated with this solution.

Comparative Example 3

3 ml of a palladium nitrate solution (50 g/l in terms of palladium) was mixed with 1.81 g of magnesium nitrate to prepare a mixture. The mixture was diluted with distilled water to prepare a solution having a total volume of 17 ml. 50 g of a lanthanum-$\beta$-alumina carrier prepared by molding a lanthanum-$\beta$-alumina carrier material into a cylindrical form having a diameter of 3 mm and a height of 3 mm was impregnated with the above-prepared solution and dried at 180° C., followed by repetition of the same procedures as in Example 1, thereby obtaining catalyst No. 9 of the comparative example.

Example 4

(metehane combustion test)

Catalysts Nos. 1 to 16 of the example and catalysts Nos. 7 to 9 of the comparative example were applied to a catalytic activity test in which a methane combustion reaction was conducted under the following conditions: a methane concentration of 1000 ppm and a space velocity of 30,000 h$^{-1}$. The activity was evaluated in terms of an ignition point required for maintaining a methane burning rate of 50%. The results are shown in Tables 2-1 and 2-2, wherein the figures in the parentheses represent an atomic rati of the base metal to the platinum group metal. The ignition point (combustion initiation temperature) in the case of a combustion catalyst for use in a gas turbine, a gas fan heater, etc. is usually in the range of 400° C. to 610° C. Therefore, in this test, the catalysts which provide a combustion temperature of 610° C. or below were regarded as being suitable (0).

TABLE 2

| Catalyst | | Ignition pt. (°C.) | Suitability |
|---|---|---|---|
| No. 1 of example | Mg—Pd (5:1) | 470 | 0 |
| No. 2 of example | Mn—Pd (5:1) | 570 | 0 |
| No. 3 of example | Sr—Pd (5:1) | 580 | 0 |

TABLE 2-continued

| Catalyst | | Ignition pt. (°C.) | Suitability |
|---|---|---|---|
| No. 4 of example | Zr—Pd (5:1) | 600 | O |
| No. 5 of example | Ni—Pd (5:1) | 600 | O |
| No. 6 of example | Co—Pd (5:1) | 610 | O |
| No. 7 of example | Cr—Pd (5:1) | 600 | O |
| No. 8 of example | Zn—Pd (5:1) | 600 | O |
| No. 9 of example | Sn—Pd (5:1) | 590 | O |
| No. 10 of example | Nb—Pd (5:1) | 580 | O |
| No. 11 of example | Mg—Pd (1:10) | 580 | O |
| No. 12 of example | Mg—Pd (1:1) | 600 | O |
| No. 13 of example | Mg—Pd (3:1) | 530 | O |
| No. 14 of example | Mg—Pd (7:1) | 550 | O |
| No. 15 of example | Mg—Pd (10:1) | 600 | O |
| No. 16 of example | Mg—Pd (20:1) | 700 | X |
| No. 1 of comp. example | Ti—Pd (5:1) | 650 | X |
| No. 2 of comp. example | Ca—Pd (5:1) | 660 | X |
| No. 3 of comp. example | Ce—Pd (5:1) | 650 | X |
| No. 4 of comp. example | La—Pd (5:1) | 630 | X |
| No. 5 of comp. example | Ba—Pd (5:1) | 650 | X |
| No. 6 of comp. example | Ag—Pd (5:1) | 650 | X |
| No. 7 of comp. example | only Pd | 630 | X |
| No. 8 of comp. example | Pd—Mg (5:1) | 650 | X |
| No. 9 of comp. example | Pd—Mg (5:1) | 630 | X |

As can be seen from the above tables, each of the catalysts Nos. 1 to 15 of example had an ignition point of 610° C. or below, i.e., was superior in heat-resistance to catalyst Nos. 1 to 9 of the comparative example.

When the Mg/Pd atomic ratio is in the range of 0.1 to 10, the ignition points are satisfactory and are 600° C. or below. On the other hand, when the Mg/Pd atomic ratio is 20, the proportion of the surface area of palladium coated with MgO is increased, causing a decrese in the active sites of the catalyst, which leads to a rise of the ignition point.

With respect to catalyst No. 1 of the example and catalysts Nos. 7 and 8 of the comparative example, the grain structure after heat treatment at 1300° C. for 20 hr was observed under an electron microscope (20,000×magnification). The results are shown in FIG. 1. In FIG. 1 palladium particles are observed in the central circular portion. As can be seen from FIG. 1, the palladium particle diameter of catalyst No. 7 of the comparative example [FIG. 1(b)] is about 15000 Å, while catalyst No. 1 of the example [FIG. 1(a)] has a palladium particle diameter as small as about 5000 Å. Further, catalyst No. 8 of the comparative example [FIG. 1(c)] has a palladium particle diameter as large as about 15,000 to 20,000 Å. From the above facts, it has been substantiated that in the catalyst of the present example, the agglomeration of the first component, i.e., the palladium particles, was suppressed by the base metal.

The catalyst No. 8 of the comparative example prepared by impregnating a carrier with a magnesium compound and then with a palladium compound exhibited a lowered activity, i.e., an ignition point of 650° C. The catalyst No. 9 of the comparative example prepared by impregnating a carrier with a mixture of magnesium with palladium also exhibited no improvement in heat resistance over a non-treated catalyst (catalyst No. 7 of the comparative example).

Figure 6:
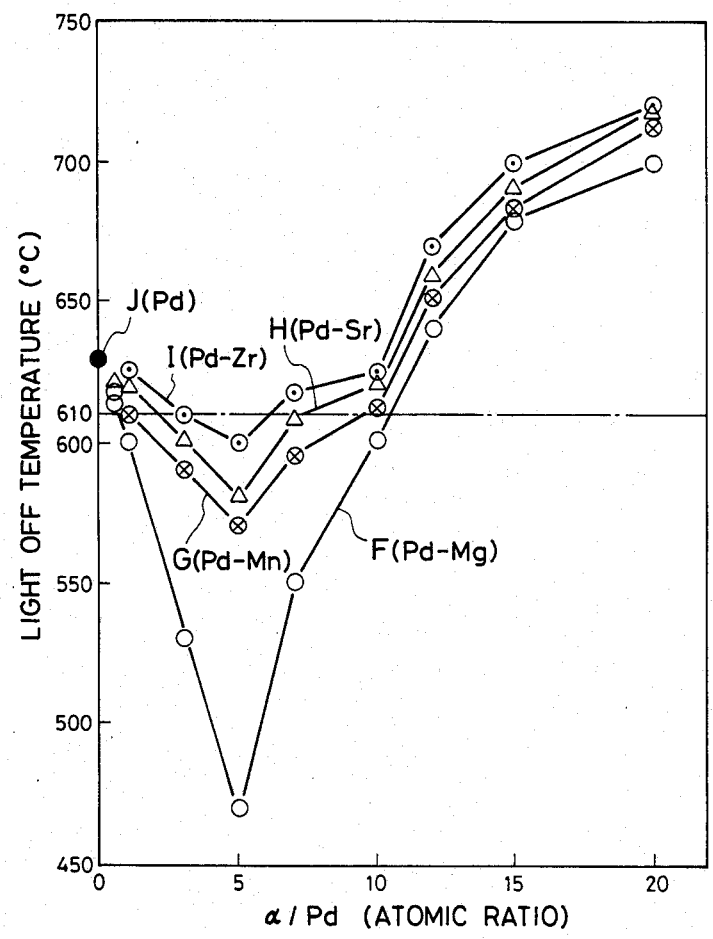
FIG. 6 is a graph showing the ignition point when the atomic ratio of base metal element to palladium is varied.

The amount of addition of the base metal relative to palladium (atomic ratio) and ignition point were determined with respect to catalysts Nos. 1 to 4 of the example. The results are shown in FIG. 6. As can be seen from FIG. 6, when an $\alpha$/Pd atomic ratio is in the range of 0.1 to 10, the ignition point is 610° C. or below (where $\alpha$ is magnesium or manganese). Catalysts which have an ignition point of 610° C. or below can be obtained also in the case of strontium and zirconium, although the $\alpha$/Pd atomic ratio range is narrow.

Comparative Example 14

In this comparative example, a $\gamma$-alumina carrier was used in place of the lanthanum-$\beta$-$Al_2O_3$ carrier. 3 ml of a palladium nitrate solution (50 g/l in terms of palladium) was diluted with distilled water to prepare a solution having a total volume of 17 ml. 50 g of a $\gamma$-alumina carrier prepared by molding a $\gamma$-alumina carrier material into a cylindrical form having a diameter of 3 mm and a height of 3 mm was impregnated with the above-prepared solution, dried at 180° C. and calcined at 1300° C. for 2 hr to remove the nitrate, thereby obtaining a $\gamma$-alumina-supported palladium catalyst (catalyst No. 10 of the comparative example). This catalyst was in the form of Pd—$Al_2O_3$ and had a palladium content of 0.3 % by weight based on the total weight of the alumina carrier.

Example 5

In this example, a $\gamma$-alumina carrier was used in place of the lanthanum-$\beta$-alumina carrier. 3 ml of a palladium nitrate solution (50 g/l in terms of palladium) was diluted with distilled water to prepare a solution having a total volume of 17 ml. 50 g of a $\gamma$-alumina carrier prepared by molding a $\gamma$-alumina carrier material into a cylindrical form having a diameter of 3 mm and a height of 3 mm was impregnated with the above-prepared solution, dried at 180° C. and calcined at 600° C. to remove the nitrate, thereby obtained a $\gamma$-alumina-supported palladium catalyst. 1.81 g of magnesium nitrate was dissolved in 17 ml of distilled water to prepare a solution. The above-prepared $\gamma$-alumina-supported palladium catalyst was impregnated with this solution, dried at 180° C. and calcined at 1300° C. for 20 hr, thereby obtaining a catalyst (catalyst No. 17 of the example). This catalyst was in the form of Mg—Pd—$Al_2O_3$ and had a palladium content of 0.3% by weight based on the total weight of the $\gamma$-alumina carrier and a Mg to Pd atomic ratio of 5/1.

Figure 2B:

With respect to catalyst No. 10 of the example and catalyst No. 17 of the comparative example, the grain structure after heat treatment at 1300° C. for 20 hr was observed under an electron microscope (20,000×magnification). The results are shown in FIG. 2. As can be seen from FIG. 2, the palladium particle diameter of the catalyst No. 10 of the comparative example [FIG. 2(b)] is about 10,000 Å, while catalyst No. 17 of the example [FIG. 2(a)] has a palladium particle diameter as small as about 3,000 Å. The above facts substantiate that in the catalyst of the present example, the agglomeration of the palladium particles can also be suppressed by the use of the $\gamma$-alumina carrier.

Example 6

(carbon monoxide gas adsorption test)

A carbon monoxide (CO) gas was adsorbed on the surface of a catalyst by the pulse method, and the surface structure of the catalyst was then analyzed. A reaction tube was packed with 10 g of a sample which had been pulverized into 32- to 48-mesh size. Helium (He) was passed through the reaction tube at 400° C. for 1 hr to remove impurities, such as oxygen and water, adsorbed on the surface of the sample. 10 ml of an adsorption gas (carbon monoxide concentration: 0.98% by volume; the balance: helium) was sampled at 80° C. from an adsorption gas feeding tube and fed into the reaction tube at predetermined intervals, thereby causing the gas to be adsorbed on the sample. The carbon monoxide concentration of the outlet gas was analyzed by thermal conductivity gas chromatography, and the carbon monoxide adsorption was completed at a point where the carbon monoxide concentration of the outlet gas was equal to the carbon monoxide gas concentration of the inlet gas. The total amount of adsorption of carbon monoxide was determined from the difference in the carbon monoxide concentration between the inlet gas and the outlet gas. Catalyst No. 1 of the example and catalysts Nos. 1 and 2 of the comparative example previously calcined at 1300° C. for 20 hr were used as the samples for the carbon monoxide adsorption test.

Figure 3:
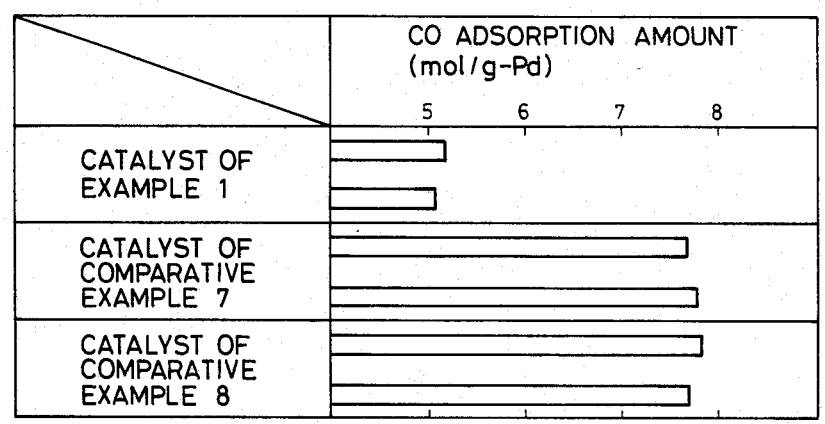
FIG. 3 shows a diagram illustrating the amount of C adsorption with respect to catalyst No. 1 of the example and catalysts No. 7 and No. 8 of the comparative example.
Figure 4:
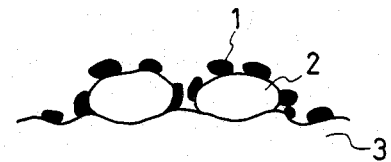
FIG. 4 shows a schematic illustration of the surface structure of catalyst No. 1 of the example.

As can be seen from the results shown in FIG. 3, the Pd—La—$\beta Al_2O_3$ catalyst (composed of a La—$\beta$—$Al_2O_3$ carrier and palladium carried thereon) exhibited the same carbon monoxide adsorption as that of the Pd—Mg—La—$\beta$—$Al_2O_3$ catalyst (composed of a La—$\beta$—$Al_2O_3$ carrier and magnesium and palladium carried thereon in that order). The carbon monoxide adsorption of the Mg—Pd—La—$\beta$—$Al_2O_3$ catalyst (composed of a La—$\beta$—$Al_2O_3$ carrier and palladium and magnesium carried thereon in that order) was about ½ of that of the Pd—Mg—La—$\beta$—$Al_2O_3$ catalyst. From these results, it may be inferred that, as shown in FIG. 4, the presence of palladium particles and magnesium or MgO particles on the La—$\beta$—$Al_2O_3$ carrier an the interspersion of magnesium of MgO particles on the palladium particles serve to prevent palladium particles from getting close to each other and suppress the agglomeration of palladium particles.

Example 7

The following catalysts Nos. 18 to 20 of the example were prepared in substantially the same manner as in Example 1, except that a chloroplatinic acid solution, a rhodium chloride solution, and a ruthenium chloride solution were used in place of the palladium nitrate solution.

| Catalyst | Composition |
|---|---|
| No. 18 of example | Mg—Pt—La—$\beta$-$Al_2O_3$ |
| No. 19 of example | Mg—Rh—La—$\beta$-$Al_2O_3$ |
| No. 20 of example | Mg—Ru—La—$\beta$-$Al_2O_3$ |

These catalyst had a platinum group element content of 0.3% by weight based on the total weight of the lanthanum—$\beta$—$Al_2O_3$ carrier and a platinum group element to palladium atomic ratio of 1:5.

Example 8

Catalysts Nos. 11 to 13 of the example were prepared in substantially the same manner as in Example 7, except that no magnesium oxide was added.

Continuous (10 hr) propane combustion tests were conducted using catalysts Nos. 18 to 20 of the example and catalysts Nos. 11 to 13 of the comparative example. A gas consisting of 1% of propane with the balance being air was preheated at 50° C. and passed over the catalyst at a space velocity of 60,000 $h^{-1}$. The combustion of propane brought about a rise in the temperature of the catalyst bed, and the maximum temperature of the catalyst bed was as high as 1100° C. With respect to each catalyst, the rate of reaction of propane 10 hr after the initiation of the combustion is shown in Table 3. As can be seen from Table 3, the catalysts Nos. 18 to 20 of the example to which magnesium oxide, i.e., an agglomeration suppressing agent for platinum group elements, had been added exhibited a high rate of reaction of propane, i.e., exhibited excellent heat resistance.

On the other hand, catalysts Nos. 11 to 13 of the comparative example to which no magnesium oxide had been added exhibited a rate of reaction of propane by about 10% lower than those of the catalysts of the example.

TABLE 3

| Catalyst | Rate of reaction of propane (%) |
|---|---|
| No. 18 of example | 99.8 |
| No. 19 of example | 99.9 |
| No. 20 of example | 99.6 |
| No. 11 of comp. example | 90.6 |
| No. 12 of comp. example | 89.7 |
| No. 13 of comp. example | 88.6 |

Example 8

A honeycomb structure (with a diameter of 90 mm and a length of 75 mm) comprising lanthanum-$\beta$-alumina was impregnated with palladium nitrate so as to have a palladium content of 0.3% by weight, dried at 120° C. and calcined at 600° C. for 2 hr to obtain a Pd—La—$\beta$—alumina catalyst. The obtained catalyst was impregnated with magnesium nitrate in an amount of 5 gram-atom of magnesium per gram-atom of palladium, dried at 120° C. and calcined at 1300° C. for 20 hr to obtain a honeycomb catalyst (catalyst No. 21 of the example). This catalyst had a specific surface area of 15 $m^2/g$ and a palladium particle diameter of 4000 Å.

Comparative Example 7

Catalyst No. 14 of the comparative example was prepared in substantially the same manner as in Example 9, except that no magnesium was added.

Example 10

A honeycomb structure (with a diameter of 90 mm and a length of 75 mm) comprised of a commercially available cordierite base material was successively impregnated with five portions of a slurry of a composite oxide containing lanthanum-$\beta$-alumina so as to have a composite oxide content of 20% by weight, dried at 120° C. and calcined at 600° C. for 2 hr. The resulting lanthanum-$\beta$-alumina-deposited cordierite base material was impregnated with palladium nitrate so as to have a palladium content of 0.3% by weight, dried at 120° C. and calcined at 600° C. for 2 hr to obtain a palladium-alnthanum-$\beta$-alumina catalyst. The obtained catalyst was impregnated with magnesium nitrate in an amount of 5 gram-atom of magnesium per gram-atom of palladium, dried at 120° C. and calcined at 1300° C. for 20 hr to obtain a honeycomb catalyst (catalyst No. 22 of the example). This catalyst had a specific surface area of 10.0 $m^2/g$ and a palladium particle diameter of 5000 Å.

Comparative Example 8

Catalyst No. 15 of the example was prepared in substantially the same manner as in Example 10, except that no magnesium was added.

Catalysts Nos. 21 and 22 of the example and catalysts Nos. 14 and 15 of the comparative example were applied to a catalytic activity test in which a methane combustion reaction was conducted under the following conditions: a methane concentration of 1000 ppm and a space velocity of 30,000 h$^{-1}$. The activity was evaluated in terms of an ignition point required for maintaining a methane burning rate of 50%. The results are shown in FIG. 5.

Figure 5:
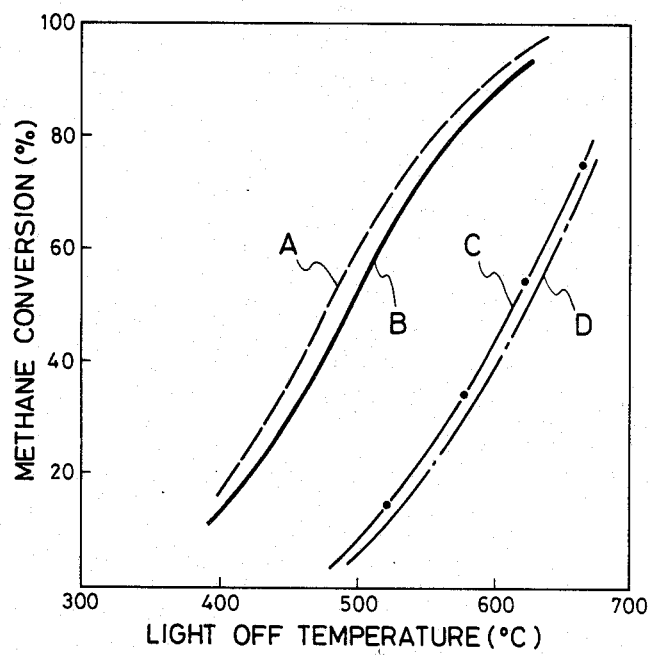
FIG. 5 shows a diagram illustrating the relationship between ignition point and methane burning rate with respect to catalysts No. 21 and No. 22 of the example and catalysts No. 15 and No. 16 of the comparative example.

As can be seen from FIG. 5 catalyst No. 21 of the example (curve A) and catalyst No. 22 of the example (curve B) have each an ignition point lower than those of the catalyst No. 14 of the comparative example (curve C) and catalyst No. 15 of the comparative example (curve D), i.e., are superior in heat resistance to these comparative catalysts.

Example 11

(steam reforming reaction)

In this example, the performance as a steam reforming catalyst was examined. 3 ml of a palladium nitrate solution (50 g/ml in terms of palladium) was diluted with distilled water to prepare a solution having a total volume of 17 ml. 50 g of a lanthanum-$\beta$-alumina carrier prepared by molding a lanthanum-$\beta$-alumina carrier material into a cylindrical form having a diameter of 3 mm and a height of 3 mm was impregnated with the above-prepared solution, dried at 180° C. and calcined at 600° C. to remove the nitrate to obtain a lanthanum-$\beta$-alumina-supported palladium catalyst.

The lanthanum-$\beta$-alumina-supported palladium catalyst was impreganated with magnesium nitrate, dried and then calcined at 900° C. for 2 hr to obtain catalyst No. 23 of the example. This catalyst had a palladium content of 0.3% by weight and a Pd to Mg atomic ratio of 1/5. A reaction tube was packed with 8 ml of this catalyst. A starting material comprised of naphtha and steam was fed into the catalyst bed. The reaction pressure and reaction temperature were set at 8 kg/cm$^2$.G and 500 to 850° C., respectively, followed by a continuous test for 100 hr. The conversion of $C_1$ was 100% at an initial stage. The catalyst maintained a high activity even 100 hr after the initiation the reaction and exhibited a conversion of $C_1$ of 99.8%.

Example 12

(dehydrogenation reaction)

In this example, the performance as a catalyst for a dehydrogenation reaction of methanol was examined. A reaction tube was packed with the same catalyst as that described in Example 11. The catalyst bed was heated to 800° C., and methanol was fed into the reaction tube to conduct a dehydrogenation reaction, thereby producing formalin. The conversion of methanol was 98% or more, and the selectivity for formalin was about 5 times those attained by conventional catalysts.

Example 13

A honeycomb structure (with a diameter of 90 mm and a length of 75 mm) comprised of a commercially available mullite base material was successively impregnated with five portions of a slurry of a composite oxide containing lanthanum-$\beta$-alumina so as to have a composite oxide content of 20% by weight, dried at 120° C. and calcined at 600° C. for 2 hr. The resulting lanthanum-$\beta$-alumina-containing mullite base material was impregnated with palladium nitrate so as to have a palladium content of 0.3% by weight, dried at 120° C. and calcined at 600° C. for 2 hr to obtain catalyst No. 24 of the example. A honeycomb catalyst was prepared from this catalyst in the same manner as in Example 10. The honeycomb catalyst thus obtained had a specific surface area of 80 m$^2$/g and a palladium particle diameter of 5500 Å.

Comparative Example 9

Catalyst No. 16 of the comparative example was prepared in substantially the same manner as in Example 13, except that no magnesium was added.

Example 14

A honeycomb structure (with a diameter of 90 mm and a length of 75 mm) comprised of a commercially available aluminum titanate base material was successively impregnated with five portions of a slurry of a composite oxide containing lanthanum-$\beta$-alumina so as to have a composite oxide content of 20% by weight. The same procedures as in Example 11 were repeated to prepare a honeycomb catalyst. The resulting honeycomb catalyst (catalyst No. 25 of the example) had a specific surface area of 95 m$^2$/g and a palladium particle diameter of 5000 Å.

Comparative Example 10

Catalyst No. 17 of the comparative example was prepared in substantially the same manner as in Example 14, except that no magnesium was added.

Example 15

A honeycomb structure (with a diameter of 90 mm and a length of 75 mm) comprised of a commercially available zirconia base material was successively impregnated with five portions of a slurry of a composite oxide containing lanthanum-$\beta$-alumina so as to have a composite oxide content of 20% by weight. The same procedures as in Example 10 were repeated to prepare a honeycomb catalyst. The resulting honeycomb catalyst (catalyst No. 26 of the example) had a specific surface area of 110 m$^2$/g and a palladium particle diameter of 4500 Å.

Comparative Example 11

Catalyst No. 18 of the comparative example was prepared in substantially the same manner as in Example 15, except that no magnesium was added.

Example 16

A honeycomb structure (with a diameter of 90 mm and a length of 75 mm) comprised of a commercially available silicon carbide base material was successively impregnated with five portions of a slurry of a composite oxide containing lanthanum-$\beta$-alumina so as to have a composite oxide content of 20% by weight. The same procedures as in Example 11 were repeated to prepare a honeycomb catalyst. The resulting honeycomb catalyst (catalyst No. 27 of the example) has a specific surface area of 90 m$^2$/g and a palladium particle diameter of 4800 Å.

Comparative Example 12

Catalyst No. 19 of the comparative example was prepared in substantially the same manner as in Example 16, except that no magnesium was added.

Example 17

Catalysts Nos. 21 to 27 of the example and catalysts Nos. 14 and 19 of the comparative example were applied to a catalytic activity test in which a methane combustion reaction was conducted under the following conditions: a methane concentration of 1000 ppm and a space velocity of 30,000 h$^{-1}$. The activity was evaluated in terms of an ignition point required for maintaining a methane burning rate of 50%. The results are shown in Table 4.

As can be seen from Table 4, catalysts Nos. 21 to 27 of the example have each an ignition point lower than those of the catalysts of the comparative example, i.e., are superior in heat resistance to those of the comparative examples.

TABLE 4

| Catalyst | Ignition pt. (°C.) | Suitability |
| --- | --- | --- |
| No. 21 of example | 480 | O |
| No. 22 of example | 500 | O |
| No. 23 of example | 530 | O |
| No. 24 of example | 520 | O |
| No. 25 of example | 500 | O |
| No. 26 of example | 510 | O |
| No. 27 of example | 530 | O |
| No. 14 of comp. example | 640 | X |
| No. 15 of comp. example | 630 | X |
| No. 16 of comp. example | 650 | X |
| No. 17 of comp. example | 630 | X |
| No. 18 of comp. example | 650 | X |
| No. 19 of comp. example | 650 | X |

As is apparent from the foregoing description, according to the present invention, the agglomeration of particles of a noble metal, such as palladium, can be suppressed, which makes it possible for a catalyst to exhibit a stable catalytic activity for a long period of time.

What is claimed is:

1. A method of catalytic combustion which comprises contacting a hydrocarbon gas fuel at a temperature of 800° to 1500° C. in the presence of oxygen with a heat-resistant catalyst comprised of at least one heat-resistant inorganic carrier selected from the group consisting of oxides, carbides and nitrides of elements belonging to Groups IIa, IIIa and IV of the Periodic Table, particles of at least one catalytically active component selected from the group consisting of platinum, palladium, rhodium and ruthenium dispersed and carried on said carrier, and particles of an oxide of at least one base metal selected from the group consisting of magnesium, manganese, nickel, cobalt, strontium, niobium, zinc, thin, chromium, and zirconium dispersed on said particles of catalytically active component, wherein the atomic ratio of said base metal to said catalytically active component is 0.1 to 10.

2. A method of catalytic combustion which comprises contacting a hydrocarbon gas fuel at a temperature of 800° to 1500° C. in the presence of oxygen with a heat-resistant catalyst comprised of at least one heat-resistant inorganic carrier comprising rare earth element-β-alumina, particles of at least one catalytically active component selected from the group consisting of platinum, palladium, rhodium and ruthenium dispersed and carried on said carrier, and particles of an oxide of at least one base metal selected from the group consisting of magnesium, manganese, nickel, cobalt, strontium, niobium, zinc, tin, chromium, and zirconium dispersed on said particles of catalytically active component, wherein the atomic ratio of said base metal to said catalytically active component is 0.1 to 10.

3. A method according to claim 2, wherein said base metal is at least one of magnesium and manganese.

4. A method according to claim 2, wherein said catalytically active component is at least one of platinum and palladium.

5. A method according to claim 4, wherein said base metal is at least one of magnesium and manganese.

6. A method according to claim 2, wherein said rare earth element-β-alumina includes at least one rare earth element selected from the group consisting of lanthanum, cerium, praseodymium, promethium, samarium, europium, gadolinium, erbium, ytterbium, yttrium, scandium and lutetium.

7. A method according to claim 6, wherein said rare earth element is lanthanum.

8. A method according to claim 7, wherein said catalytically active component is at least one of platinum and palladium.

9. A method according to claim 8, wherein said base metal is at least one of magnesium and manganese.

* * * * *